United States Patent [19]

Kioka et al.

[11] 4,401,589
[45] Aug. 30, 1983

[54] PROCESS FOR PRODUCING OLEFIN POLYMERS OR COPOLYMERS

[75] Inventors: Mamoru Kioka, Ohtake; Hiroaki Kitani, Waki; Norio Kashiwa, Iwakuni, all of Japan

[73] Assignee: Mitsui Petrochemical Industries Ltd., Tokyo, Japan

[21] Appl. No.: 322,201

[22] Filed: Nov. 17, 1981

Related U.S. Application Data

[62] Division of Ser. No. 159,440, Jun. 13, 1980, Pat. No. 4,330,649.

[30] Foreign Application Priority Data

Jun. 18, 1979 [JP] Japan .................................. 54-75582

[51] Int. Cl.³ ............................................... C08F 4/64
[52] U.S. Cl. .................................................. 252/429 B
[58] Field of Search ...................................... 252/429 B

[56] References Cited

U.S. PATENT DOCUMENTS 3,989,881 11/1976 Yamaguchi et al. ........ 252/429 B X
4,115,319  9/1978 Scata et al. ..................... 252/429 B
4,124,532 11/1978 Giannini et al. ................. 252/429 B
4,174,299 11/1979 Giannini et al. ................. 252/429 B

FOREIGN PATENT DOCUMENTS 50-131887 10/1975 Japan .
54-40293   3/1979 Japan .
54-66392   5/1979 Japan .

*Primary Examiner*—Patrick Garvin
*Attorney, Agent, or Firm*—Sherman & Shalloway

[57] ABSTRACT

Improved process for producing olefin polymer or copolymer characterized by using (I) a solid catalyst component (A) which is the product of reaction of (a) a magnesium compound in the liquid state having no reducing ability with (b) a titanium compound in the liquid state in the presence of an electron donor having no active hydrogen, said magnesium compound (a) being a liquid magnesium compound or a solution of a magnesium compound or being obtained by contacting the magnesium compound with at least one electron donor selected from the group consisting of alcohols, organic carboxylic acids, aldehydes, amines and mixtures thereof, or the product of reaction of the magnesium compound (a) with the titanium compound (b) in the absence of the electron donor having no active hydrogen atom followed by treatment with the electron donor having no active hydrogen atom, and (II) the mole ratio of the compound (a) to the compound (b), calculated as metal atoms, is at least about 2.

12 Claims, No Drawings

PROCESS FOR PRODUCING OLEFIN POLYMERS OR COPOLYMERS

This is a division of application Ser. No. 159,440 filed June 13, 1980, now U.S. Pat. No. 4,330,649 issued May 18, 1982.

This invention relates to an improved process for producing olefin polymers (sometimes used to denote both homopolymers and copolymers of olefins) by polymerizing (sometimes used to denote both homopolymerization and copolymerization) using a specified catalyst.

The process of this invention can be used favorably in polymerizing alpha-olefins having 2 to 8 carbon atoms, and can afford highly stereospecific polymers when applied, for example, to the polymerization of alpha-olefins having at least 3 carbon atoms. Even when the melt index of such a polymer is adjusted to the desired value by using a molecular weight controlling agent such as hydrogen, the stereospecificity of the polymer shows little or no decrease. Furthermore, when the process of this invention is carried out by the slurry polymerization method or gaseous phase polymerization method, a granular or spherical polymer having good flowability can be produced with excellent catalytic activity and a good reproducibility of quality.

More specifically, this invention pertains to a process for producing a polymer or copolymer of an olefin, for example an alpha-olefin having 2 to 8 carbon atoms, which comprises polymerizing or copolymerizing the olefin or olefins with or without up to about 5 mole% of a diolefin in the presence of a catalyst composed of (A) a solid titanium catalyst component containing magnesium, titanium, halogen and an electron donor and derived from a magnesium compound in the liquid state, a halogen-containing titanium compound in the liquid state and the electron donor, and (B) an organometallic compound of a metal selected from the group consisting of metals of Groups I to III of the periodic table; characterized in that (I) said catalyst component (A) is the product of reaction of (a) a magnesium compound in the liquid state having no reducing ability with (b) a titanium compound in the liquid state in the presence of an electron donor having no active hydrogen, said magnesium compound (a) being a liquid magnesium compound or a solution of a magnesium compound in a hydrocarbon solvent, or being obtained by contacting the magnesium compound with at least one electron donor selected from the group consisting of alcohols, organic carboxylic acids, aldehydes, amines and mixtures thereof, or the product of reaction of the magnesium compound (a) with the titanium compound (b) in the absence of the electron donor having no active hydrogen atom followed by treatment with the electron donor having no active hydrogen, and (II) the mole ratio of the compound (a) to the compound (b), calculated as metal atoms, is at least about 2.

Numerous suggestions have been known about the polymerization of olefins using a solid titanium catalyst component containing magnesium, titanium, halogen and an electron donor. Polymerization of alpha-olefins having at least 3 carbon atoms using this catalyst component can give highly stereospecific polymers with high catalytic activity.

It has been desired however to improve stereospecificity and catalytic activity, and also to provide polymer particles of such good flowability as to require no pelletization with a good reproducibility of quality. When it is desired to obtain a polymer of a high melt index using a molecular weight controlling agent such as hydrogen, the stereospecificity of the resulting polymer is inevitably reduced. Thus, it has been desired to develop means for advantageously avoiding such a problem. The solid titanium catalyst component varies greatly in properties depending upon the method of its preparation, and many different suggestions have been made about a combination of starting ingredients, the sequence of reacting these ingredients, means of performing such reactions, etc.

Conventionally, the solid titanium catalyst component has been prepared by reacting a magnesium compound, an electon donor and a titanium compound optionally together with auxiliary agents such as an organoaluminum compound and a silicon compound in different combinations by different means. In most of the prior suggestions, the magnesium compound is used as a solid, and as an exception, Grignard compounds in liquid state which are magnesium compounds having reducing ability are used.

One prior suggestion of producing a solid titanium catalyst component containing magnesium, titanium, halogen and an electron donor and derived from a magnesium compound in the liquid state, a titanium compound in the liquid state and the electron donor is disclosed in Japanese Laid-Open Patent Publication No. 40293/79 (published March 29, 1979). This prior method utilizes the fact that a compound of the formula $Ti(OR^2)_4$ wherein $R^2$ is $C_1$–$C_{10}$ alkyl, aryl or cycloalkyl well dissolves a compound of the formula $Mg(OR^1)_{2-n}X_n$ wherein $R^1$ is $C_1$–$C_{10}$ alkyl, aryl or cycloalkyl, X is halogen, and $0 < n \leq 2$ and an electron donor to form a homogenous solution. The solid titanium catalyst component is prepared in accordance with this prior method by forming a homogenous solution of the aforesaid three compounds, subjecting the solution to a precipitating treatment to form a solid composition containing magnesium, titanium, halogen and the electron donor, and contacting the resulting solid composition with a titanium compound in the liquid state. According to this method, the precipitating treatment can be performed by lowering the temperature of the solution; or by adding to the solution a non-solvent for a solid component to be precipitated; or by adding a precipitating agent such as a halogen compound of silicon or tin to the solution. All the working examples in this prior Patent Publication show only an embodiment of adding the precipitating agent. It is still desired to improve the stereospecificity of a polymer obtained by polymerizing an olefin using the solid titanium catalyst component prepared by this prior method, and also the catalytic activity of the catalyst component obtained by this method. When an attempt is made to produce a polymer of a high melt index by polymerizing an olefin in the presence of a molecular weight controlling agent such as hydrogen using the solid titanium catalyst component obtained by this prior method, the stereospecificity of the polymer and the catalytic activity of the catalyst component are reduced to unnegligible degrees. The prior suggestions also suffer from the disadvantage that before contact with the titanium compound in liquid state, a means of precipitating the solid composition is required.

Another prior suggestion was made in Japanese Laid-Open Patent Publication No. 66392/79 (published May 28, 1979) which discloses the utilization of a solid titanium catalyst component obtained by reacting a hydrocarbon-soluble organomagnesium compound which has reducing ability and a titanium compound and/or a vanadium compound containing at least one halogen atom. According to this suggestion, the solid titanium catalyst component can be formed by directly reacting the organomagnesium compound in the liquid state with the titanium compound in the liquid state. Further improvement is desired in regard to this solid titanium catalyst component as in the prior suggestion described above. This prior method has also been found to suffer from the defect that in polymerization in the presence of a molecular weight controlling agent, there is a substantial reduction in stereospecificity and catalytic activity.

Japanese Laid-Open Patent Publication No. 131887/75 (published Oct. 18, 1975) discloses a method for preparing a solid titanium catalyst component containing magnesium, titanium, halogen and an electron donor which is characterized by coprecipitation from a solution of a titanium tetrahalide/ether complex and a magnesium halide/ether complex. The use of the resulting solid titanium catalyst component, however, has the same disadvantages as in the other prior suggestions discussed hereinabove, and further improvement is desired.

The present inventors have made investigations about the development of an excellent catalyst for polymerization of olefins which can achieve high stereospecificity and catalytic activity that do not substantially decrease in the presence of a molecular weight controlling agent, and which can be prepared without a special precipitating means and can be used without the disadvantages and difficulties that are encountered by the prior techniques in using a solid titanium catalyst component containing magnesium, titanium, halogen and an electron donor and derived from a magnesium compound in the liquid state, a titanium compound in the liquid state and the electron donor.

These investigations have led to the discovery that a solid titanium catalyst component prepared by directly reacting (a) a magnesium compound in the liquid state having no reducing ability which is a liquid magnesium compound or a solution of a magnesium compound in a hydrocarbon, or is prepared by contacting the magnesium compound with at least one electron donor selected from the group consisting of alcohols, organic carboxylic acids, aldehydes, amines and mixtures thereof, with (b) a halogen-containing titanium compound in the liquid state in the presence of an electron donor having no active hydrogen such as an organic acid ester, or by performing the above reaction in the absence of the electron donor and then treating the product with the electron donor can achieve the further improvements desired in the prior art and thus overcome the troubles associated with the prior suggestions.

It has specifically been found that the titanium catalyst component having superior properties can be easily prepared, without the need to perform any special precipitating means, by contacting a magnesium compound having no reducing ability and rendered liquid by treating a magnesium compound with a liquid medium selected from the group consisting of hydrocarbon solvents, electron donors soluble in the magnesium compound and mixtures thereof, directly with a titanium compound in the liquid state, such as a liquid tetravalent titanium compound containing halogen (e.g., titanium tetrachloride) or a solution of a titanium compound in a suitable solvent, to form a solid reaction product, the reaction being carried out in the presence of an electron donor having no active hydrogen, or in the absence of the electron donor but followed by contacting of the reaction product with the electron donor.

It is an object of this invention therefore to provide an improved process for producing a polymer or copolymer of an olefin.

Another object of this invention is to provide a solid titanium catalyst component for use in the aforesaid improved process, and a process for producing such a catalyst component.

These and other objects and advantages of this invention will become more apparent from the following description.

The solid titanium catalyst component used in this invention is the reaction product obtained by directly reacting (a) a magnesium compound in the liquid state having no reducing ability with (b) a titanium compound in the liquid state. The reaction product is obtained by performing the above reaction in the presence of an electron donor having no active hydrogen, or by performing the reaction in the absence of the electron donor and then treating the product with the electron donor. The magnesium compound (a) is obtained by contacting a magnesium compound with at least one electron donor selected from the group consisting of alcohols, organic carboxylic acids, aldehydes, amines and mixtures thereof.

In addition to the above requirement, the solid titanium catalyst component in accordance with this invention must have an (a)/(b) mole ratio, calculated as metal atoms, of at least about 2, preferably from 2 to 1000. If no consideration is given to economy, this mole ratio may be as high as is desired.

The magnesium compound having no reducing ability, which is used in the preparation of the solid titanium catalyst component, i.e. a magnesium compound free from a magnesium-carbon linkage or a magnesium-hydrogen linkage, may be the one derived from a magnesium compound having reducing ability.

Examples of the magnesium compound having no reducing ability are magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride, and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium and octoxy magnesium; aryloxy magnesiums such as phenoxy magnesium and dimethylphenoxy magnesium; and magnesium salts of carboxylic acids such as magnesium laurate and magnesium stearate. The magnesium compounds may be in the form of complexes with other metals or mixtures with other metal compounds. Or two or more of these magnesium compounds may be used as mixtures. Preferred magnesium compounds are the halogen-containing magnesium compounds, above all magnesium chloride, alkoxy magnesium chlorides, preferably those having $C_1$–$C_{10}$ alkoxy, and aryloxy magnesium chlorides, preferably those having $C_6$–$C_{20}$ aryloxy.

The magnesium compound (a) in the liquid state having no reducing ability may be a liquid magnesium compound or a solution of a magnesium compound in a hydrocarbon solvent. Or it can be formed by contacting the aforesaid magnesium compound with at least one electron donor selected from the group consisting of alcohols, organic carboxylic acids, aldehydes, amines and mixtures thereof in the presence or absence of a hydrocarbon solvent capable of dissolving the magnesium compound. The embodiment of contacting with the specified electron donor is preferred.

Examples of the hydrocarbon solvent used for this purpose include aliphatic hydrocarbons such as pentane, hexane, heptane, octane, decane, dodecane, tetradecane and kerosene; alicyclic hydrocarbons such as cyclopentane, methyl cyclopentane, cyclohexane, methyl cyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

A solution of the magnesium compound in such a hydrocarbon solvent can be prepared, for example, by simply mixing both; mixing both and heating the mixture; or by mixing them in the presence of an electron donor soluble in the magnesium compound which is selected from the group consisting of alcohols, aldehydes, amines, carboxylic acids and mixtures thereof or a mixture of it with another electron donor (to be described), and optionally heating the mixture. The method of preparation, however, differs depending upon the types of the magnesium compound and the solvent. In the case of dissolving a halogen-containing magnesium compound in a hydrocarbon solvent using an alcohol as a donor electron, the alcohol may be used in an amount of at least about 0.5 mole, preferably about 0.5 to about 20 moles, especially preferably about 1.0 to about 12 moles, per mole of the halogen-containing magnesium compound, although the amount differs depending upon the type or amount of the hydrocarbon solvent, the type of the magnesium compound, etc. When an aliphatic hydrocarbon or an alicyclic hydrocarbon is used as the hydrocarbon solvent, alcohols are used in the aforesaid amount, but if among these alcohols, alcohols having at least 6 carbon atoms are used in an amount of at least 0.5 mole, preferably at least 1.0 moles, per mole of the halogen-containing magnesium compound, the halogen-containing magnesium compound can be solubilized, and a catalyst component having high catalytic activity can be obtained, by using the alcohols in a small total amount. Thus, this embodiment is preferred. If in this case only alcohols having 5 or less carbon atoms are used, the total amount of the alcohols should be at least about 15 moles per mole of the halogen-containing magnesium compound, and the resulting catalyst component has lower catalytic activity than in the case of using the alcohols in the aforesaid manner. On the other hand, if an aromatic hydrocarbon is used as the hydrocarbon solvent, the halogen-containing magnesium compound can be solubilized by using the alcohols in an amount of about 1 to about 20 moles, preferably about 1.5 to about 12 moles, irrespective of the types of the alcohols.

Contacting of the halogen-containing magnesium compound with the alcohol is preferably carried out in a hydrocarbon medium. The contacting is carried out at room temperature or at higher temperatures, for example at least about 65° C., preferably about 80° to 300° C., more preferably about 100° to about 200° C., depending upon the types of the magnesium compound and alcohol, for a period of about 15 minutes to about 5 hours, preferably about 30 minutes to about 2 hours.

Examples of preferred alcohols having at least 6 carbon atoms, preferably 6 to 20 carbon atoms, as the electron donor used to form (a) the magnesium compound in the liquid state include aliphatic alcohols such as 2-methylpentanol, 2-ethylbutanol, n-heptanol, n-octanol, 2-ethylhexanol, decanol, dodecanol, tetradecyl alcohol, undecenol, oleyl alcohol and stearyl alcohol; alicyclic alcohols such as cyclohexanol and methyl cyclohexanol; and aromatic alcohols such as benzyl alcohol, methylbenzyl alcohol, isopropylbenzyl alcohol, α-methylbenzyl alcohol and α,α-dimethylbenzyl alcohol. Other examples include alcohols having not more than 5 carbon atoms such as methanol, ethanol, propanol, butanol, ethylene glycol and methyl carbitol.

Suitable carboxylic acids used for the formation of the magnesium compound (a) are organic carboxylic acids having at least 7, preferably 7 to 20, carbon atoms, such as caprylic acid, 2-ethylhexanoic acid, undecylenic acid, undecanoic acid, nonylic acid and octanoic acid.

Suitable aldehydes for use in the formation of the magnesium compound (a) are aldehydes having at least 7, preferably 7 to 18, carbon atoms, such as capric aldehyde, 2-ethylhexyl aldehyde, caprylaldehyde and undecylic aldehyde. Suitable amines for use in preparing the magnesium compound (a) are amines having at least 6, preferably 6 to 18, carbon atoms, such as heptylamine, octylamine, nonylamine, decylamine, laurylamine, indecylamine and 2-ethylhexylamine.

Suitable amounts of these carboxylic acids, aldehydes or amines and suitable temperatures of use are substantially the same as those described hereinabove with regard to the alcohols. Alcohols are especially preferred as the electron donor for use in forming the magnesium compound (a) in the liquid state.

Examples of other electron donors which can be used together with the aforesaid magnesium compound-soluble electron donors include organic acid esters, organic acid halides, organic acid anhydrides, ethers, ketones, tertiary amines, phosphite esters, phosphate esters, phosphoric amide, carboxylic amides and nitriles. Specific examples are those exemplified hereinbelow as electron donors having no active hydrogen used in preparing the catalyst of this invention.

The magnesium compound (a) in the liquid state can also be prepared by using magnesium metal or magnesium compound convertible to the aforesaid magnesium compound, and dissolving it in the aforesaid donor or donors and the hydrocarbon solvent while converting it into the aforesaid magnesium compound. For example, this can be achieved by dissolving or suspending a magnesium compound containing alkyl, alkoxy, aryloxy, acyl, amino, hydroxyl, etc., magnesium oxide, magnesium metal, etc. in a hydrocarbon solvent in which the aforesaid alcohol, amine, aldehyde or carboxylic acid is dissolved, and converting it into a halogen-containing magnesium compound having no reducing ability while halogenating it with a halogenating agent such as a hydrogen halide, a silicon halide and halogen. Alternatively, it is possible to treat a magnesium compound having reducing ability, such as Grignard reagents, dialkyl magnesiums, magnesium halides and complexes of these with other organometallic compounds, e.g. $M_\alpha Mg_\beta R^1_p R^2_q X_r Y_s$ (wherein M represents aluminum, zinc, boron or beryllium; $R^1$ and $R^2$ are hydrocarbon groups; X and Y represent groups of the formulae $OR^3$, $OSiR^4R^5R^6$, $NR^7R^8$ and $SR^9$; $R^3$, $R^4$, $R^5$, $R^6$, $R^7$ and $R^8$ are hydrogen or hydrocarbon groups; $R^9$ is a hydrocarbon group; $\alpha, \beta > 0$; p, q, r, $s \geq 0$; m is the atomic valency of M; provided that $\beta/\alpha \geq 0.5$, $p+q+r+s = m\alpha + 2\beta$, and $0 \leq (r+s)/(\alpha+\beta) < 1.0$; the hydrocarbon group above is preferably selected from alkyl groups having 1 to 10 carbon atoms, or aryl groups having 6 to 20 carbon atoms) with a compound capable of destroying the reducing ability of the magnesium compound, such as an alcohol, ketone, ester, ether, acid halide, silanol or siloxane to convert it into a magnesium having no reducing ability which can be used in the present invention.

The use of the magnesium having no reducing ability (a) is essential in the present invention, but this does not preclude the use of a magnesium compound having reducing ability in combination. In many cases, it is not desirable to use a large amount of the compound having reducing ability together.

A solution of the magnesium compound (a) in the liquid state in an electron donor may also be used. Electron donors suitable for this purpose are selected from alcohols, amines, aldehydes, carboxylic acids and mixtures thereof which are exemplified hereinabove. Alcohols are especially preferred. The amounts of the ingredients and the dissolving temperature used for preparing such a solution are the same as in the case of forming the magnesium compound having no reducing ability (a) by dissolving a magnesium compound in a hydrocarbon solvent while contacting it with an electron donor selected from the group consisting of alcohols, organic carboxylic acids, aldehydes, amines and mixtures thereof.

Generally, however, the dissolving temperature is preferably maintained at a relatively high level, and the reactants are preferably dissolved in a hydrocarbon solvent.

Examples of the titanium compound in the liquid state (b) to be directly reacted with the magnesium compound (a) in preparing the solid titanium catalyst component are tetravalent titanium compounds of the formula $Ti(OR)_gX_{4-g}$ wherein R represents a hydrocarbon group, X represents a halogen atom and g is a number represented by $0 \leq g < 4$, preferably $0 \leq g \leq 3.5$, more preferably $0 \leq g \leq 2$. Examples of the group R are alkyl groups having 1 to 10 carbon atoms.

Examples of the titanium compounds (b) are titanium tetrahalides such as $TiCl_4$, $TiBr_4$ and $TiI_4$; alkoxy titanium trihalides such as $Ti(OCH_3)Cl_3$, $Ti(OC_2H_5)Cl_3$, $Ti(On-C_4H_9)Cl_3$, $Ti(OC_2H_5)Br_3$ and $Ti(Oiso-C_4H_9)Br_3$; alkoxy titanium dihalides such as $Ti(OCH_3)_2Cl_2$, $Ti(OC_2H_5)_2Cl_2$, $Ti(On-C_4H_9)_2Cl_2$ and $Ti(OC_2H_5)_2Br_2$; trialkoxy titanium monohalides such as $Ti(OCH_3)_3Cl$, $Ti(OC_2H_5)_3Cl$, $Ti(On-C_4H_9)_3Cl$ and $Ti(OC_2H_5)_3Br$; and mixtures of these with tetraalkoxy titaniums such as $Ti(OCH_3)_4$; $Ti(OC_2H_5)_4$ and $Ti(On-C_4H_9)_4$ or other compounds such as aluminum compounds and silicon compounds. Of these, the halogen-containing titanium compounds, especially titanium tetrahalides, specifically titanium tetrachloride, are preferred.

The titanium compound (b) in the liquid state may be any single liquid titanium compound of the type exemplified hereinabove, or a mixture of such titanium compounds, or a solution of a titanium compound such a titanium compound in a solvent such as a hydrocarbon.

The electron donor having no active hydrogen which is used in preparing the solid titanium catalyst component (A) in this invention may, for example, include organic acid esters, organic acid halides, organic acid anhydrides, ethers, aldehydes, ketones, tertiary amines, phosphite esters, phosphate esters, phosphoric amide, carboxylic amides, and nitriles. Specific examples are ketones having 3 to 15 carbon atoms such as acetone, methyl ethyl ketone, methyl isobutyl ketone, acetophenone, benzophenone, cyclohexanone and benzoquinone; aldehydes having 2 to 15 carbon atoms such as acetaldehyde, propionaldehyde, octylaldehyde, benzaldehyde, tolualdehyde and naphthoaldehyde; organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, methyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl t-butylbenzoate, methyl anisate, ethyl anisate, ethyl ethoxybenzoate, $\gamma$-butyrolactone, $\delta$-valerolactone, coumarine, phthalide and ethylene carbonate; inorganic acid esters, for example, alkyl alkoxy silanes such as ethyltriethoxysilane; acid halides having 2 to 15 carbon atoms such as acetyl chloride, benzoyl chloride, toluoyl chloride and anisoyl chloride; ethers having 2 to 20 carbon atoms such as methyl ether, ethyl ether, isopropyl ether, butyl ether, amyl ether, tetrahydrofuran, anisole and diphenyl ether; acid amides such as acetic N,N-dimethylamide, benzoic N,N-diethylamide, and toluic N,N-dimethylamide; tertiary amines such as trimethylamine, triethylamine, tributylamine, tribenzylamine and tetramethylethylenediamine; and nitriles such as acetonitrile, benzonitrile and tolunitrile.

These electron donors may be used in combination with each other. Among these electron donors, the organic acid esters, especially aromatic carboxylic acid esters, are preferred. It is not always necessary to use such an electron donor as a starting material, and it may be formed in the course of preparing the solid titanium catalyst component (A). Or they may be used in the form of adducts or complexes with other compounds.

The solid titanium catalyst component (A) in this invention can be prepared by directly contacting the magnesium compound (a) having no reducing ability in the liquid state with the titanium compound (b) in the liquid state in the presence of an electron donor having no active hydrogen, i.e. by contacting them directly with each other in the liquid state. Alternatively, it may be obtained by performing the aforesaid reaction of the compound (a) with the compound (b) in the absence of the electron donor having no active hydrogen, and then contacting the resulting product with the electron donor.

When in the first-mentioned embodiment, the compound (a) and/or (b) contains an electron donor having no active hydrogen, it is not necessary to further add the donor in contacting the compounds (a) and (b). If desired, however, an additional supply of electron donor may be fed. The electron donor having no active hydrogen may be included in the magnesium compound having no reducing ability in the liquid state (a) by adding the electron donor to the magnesium compound (a) and mixing them, or by jointly using such an electron donor in the formation of the magnesium compound (a) in the aforesaid manner.

For example, an excess of an electron donor having no active hydrogen is added to a solution of an alkyl magnesium compound having reducing ability in a hydrocarbon to destroy the reducing ability of the magnesium compound. Or a mixture of an electron donor having no active hydrogen and an electron donor having active hydrogen is added to the aforesaid hydrocarbon solution to destroy the reducing ability of the magnesium compound. The resulting product is rendered soluble in a hydrocarbon solvent by the method described hereinabove, and may be used in this invention. Or it is possible to add a compound capable of being converted to an electron donor having no active hydrogen, and form the electron donor having no active hydrogen in situ.

The amount of the electron donor having no active hydrogen may be properly changed. For example, it is about 0.01 to about 10 moles, preferably about 0.01 to about 5 moles, more preferably about 0.1 to about 1 mole, per mole of the magnesium compound. Even if the electron donor having no active hydrogen is used in a large amount, adjustment of the amount of the titanium compound (b) may lead to a solid catalyst component of high performance. However, the use of the electron donor in the aforesaid amounts is preferred.

The titanium compound in the liquid state (b) may be a liquid titanium compound, or a solution of a titanium compound in a hydrocarbon solvent. At this time, the electron donor having no active hydrogen or a compound convertible to the electron donor in the course of the reaction may be included in the titanium compound in the liquid state. In this case, however, it is preferred to use a large amount of the titanium compound so that there is present a free titanium compound which does not form a complex with the electron donor having no active hydrogen. Specifically, it is preferred to use the titanium compound in an amount of more than 1 mole, preferably at least 5 moles, per mole of the electron donor having no active hydrogen.

The titanium compound in the liquid state (b) is used in such an amount that a solid titanium catalyst component can be formed and precipitated by directly contacting it with the magnesium compound in the liquid state (a) without performing any special precipitating treatment. The amount may be properly selected depending upon the types of the two compounds (a) and (b), the other contacting conditions, the amount of the electron donor, etc. For example, it is at least about 1 mole, usually about 5 to about 200 moles, especially about 10 moles to about 100 moles, per mole of the mangesium compound. Furthermore, the titanium compound may be used in an amount of more than about 1 mole, especially more than about 5 moles, for example about 1 to about 1000 moles, per mole of the electron donor.

The magnesium compound (a) in the liquid state having no reducing ability and the titanium compound (b) in the liquid state may be contacted with each other by any methods by which the magnesium compound solution can be directly contacted with the titanium compound in the liquid state. At this time, the shape or size of the solid titanium catalyst component may vary depending upon the contacting conditions.

One preferred method comprises mixing the magnesium compound (a) in the liquid state and the titanium compound (b) in the liquid state at a low enough temperature not to form a solid product rapidly upon their contacting, and heating the mixture to form a solid product gradually. This method easily gives a granular or spherical solid titanium catalyst component in a relatively large particle diameter. By causing a suitable amount of an electron donor having no active hydrogen to be present in the performance of this method, a granular or spherical solid titanium catalyst component having an improved particle size distribution can be obtained. Polymers obtained by slurry polymerization using such a solid titanium catalyst composition are in the form of granules or spherical particles with a good particle size distribution, and have a high bulk density and good flowability. Granules, as used herein, mean particles which look as if they were an assembly of fine particles when viewed by an enlarged photograph. Depending upon the method of preparing the solid titanium catalyst component, the granules may range from particles having a number of raised and depressed portions to nearly spherical particles.

In preparing the solid titanium catalyst component by directly reacting the compounds (a) and (b), the contacting temperature is, for example, about $-70°$ C. to about $+200°$ C. The temperatures of the liquid compounds to be contacted may differ from each other. Generally, in many cases, high temperatures should preferably be avoided during the mixing of the aforesaid compounds (a) and (b) in order to obtain a solid titanium catalyst component of high performance in the form of granules or spherical particles. For example, temperatures of about $-70°$ C. to about $+50°$ C. are preferred. If the contacting temperature is too low, precipitation of a solid product sometimes does not occur. In such a case, the reaction is desirably performed at an elevated temperature of, say, about 50 to about 150° C., or the contacting is performed for an extended period of time to precipitate a solid product. Preferably, the solid product is washed one or more times with an excess of a liquid titanium compound, preferably titanium tetrachloride at a temperature of about 50° to about 150° C. Then, the product is further washed with, for example, a hydrocarbon for subsequent use in polymerization. This method is excellent because the operation is simple and a solid titanium catalyst component of high performance can be obtained.

In another embodiment of this invention, the magnesium compound (a) and the titanium compound (b) are directly reacted with each other in the liquid state in the presence of an electron donor having no active hydrogen, and also, the compounds (a) and (b) may be directly reacted in the absence of the electron donor having no active hydrogen and the resulting product may be contacted with the electron donor having no active hydrogen. In performing this embodiment, the magnesium compound (a) in the liquid state and the titanium compound (b) in the liquid state are contacted in the same proportions and under the same conditions as in the aforesaid embodiment to obtain a suspension containing a solid reaction product. Generally, an electron donor containing no active hydrogen is added to the suspension and reacted at a temperature of about 0° to about 150° C. The amount of the electron donor having no active hydrogen is the same as in the first-mentioned embodiment. The resulting solid product may be washed one or more times at about 50 to about 150° C. with an excess of a liquid titanium compound, preferably titanium tetrachloride, in the same manner as in the first-mentioned embodiment.

In the present invention, both of these embodiments may be used jointly. Thus, the particle size or shape of the titanium catalyst component may be controlled by the first-mentioned embodiment, and the properties of the catalyst component may be minutely controlled by the latter embodiment. According to one specific example of this embodiment, the magnesium compound (a) in the liquid state is contacted with the titanium compound (b) in the liquid state in the presence of an electron donor having no active hydrogen. The solid product may be contacted with a fresh supply of an electron donor having no active hydrogen during or after precipitating the solid product.

Preferably, the solid titanium catalyst component (A) obtained in the aforesaid embodiments is washed well with a hydrocarbon prior to use in polymerization.

In the solid titanium catalyst component, the mole ratio of compound (a) to compound (b), calculated as metal atoms, i.e. the Mg/Ti atomic ratio, is from about 2 to about 100, preferably from about 4 to about 50, more preferably from about 5 to about 30.

Furthermore, in the solid titanium catalyst component (A), the halogen/Ti atomic ratio is from about 4 to about 100, preferably from about 5 to about 90, more preferably from about 8 to about 50.

The amount of the electron donor having no active hydrogen in the solid titanium catalyst component is about 0.01 to about 100 moles, preferably about 0.2 to about 10 moles, more preferably about 0.4 to about 6 moles, per mole of titanium atom.

In most cases, the solid titanium catalyst component used in this invention is in the form of granules or nearly spherical particles, and have a specific surface area of at least about 10 m$^2$/g, preferably about 100 to about 1000 m$^2$/g.

In accordance with this invention, olefins are polymerized or copolymerized in the presence of a catalyst composed of the resulting solid titanium catalyst component (A) and an organometallic compound (B) of a metal of Groups I to III of the periodic table.

Examples of the organometallic compounds of metals of Groups I to III of the periodic table are given below.

(i) Organoaluminum compounds having at least one Al-C linkage in the molecule, for example, organoaluminum compounds of the general formula $$R^1_m Al(OR^2)_n H_p X_q$$

wherein $R^1$ and $R^2$ are identical or different and represent a hydrocarbon group containing 1 to 15 carbon atoms, preferably 1 to 4 carbon atoms; X represents a halogen atom; m is a number represented by $0 < m \leq 3$; n is a number represented by $0 \leq n < 3$; p is a number represented by $0 \leq p < 3$; q is a number represented by $0 \leq q < 3$; and $m + n + p + q = 3$.

Examples of the hydrocarbon groups in the above formula are alkyl groups.

(ii) Alkylated complexes of metals of Group I and aluminum which are represented by the general formula $$M^1 Al R^1_4$$

wherein $M^1$ is Li, Na or K, and $R^1$ is as defined above.

(iii) Dialkyl compounds of metals of Group II which are represented by the general formula $$R^1 R^2 M^2$$

wherein $R^1$ and $R^2$ are as defined above, and $M^2$ represents Mg, Zn or Cd.

Examples of the organoaluminum compounds (i) above are those of the following general formulae.

$$R^1_m Al(OR^2)_{3-m}$$

wherein $R^1$ and $R^2$ are as defined hereinabove, and m is preferably a number represented by $1.5 \leq m \leq 3$.

$$R^1_m Al X_{3-m}$$

wherein $R^1$ is as defined above, X is halogen, and m is preferably a number represented by $0 < m < 3$.

$$R^1_m Al H_{3-m}$$

wherein $R^1$ is as defined above, and m is preferably a number represented by $2 \leq m < 3$.

$$R^1_m Al(OR^2)_n X_q$$

wherein $R^1$ and $R^2$ are as defined above, X is halogen, $0 < m \leq 3$, $0 \leq n < 3$, $0 \leq q < 3$, and $m + n + q = 3$.

Specific examples of the aluminum compounds (i) include trialkyl aluminums such as triethyl aluminum and tributyl aluminum; trialkenyl aluminum such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride and propyl aluminum dichloride; dialkyl aluminum hydrides such as diethyl aluminum hydride and dibutyl aluminum hydride; partially hydrogenated alkyl aluminums, for example alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

LiAl($C_2H_5$)$_4$ and LiAl($C_7H_{15}$)$_4$ are cited as examples of the compounds (ii) above, and diethyl lead and diethyl magnesium are cited as examples of the compound (iii). Alkyl magnesium halides such as ethyl magnesium chloride can also be used. Of the above compounds, trialkyl aluminums, alkyl aluminum halides, and mixtures of these are preferred.

According to the process of this invention, olefins are polymerized with or without up to about 5 mole% of a diolefin in the presence of a catalyst composed of (A) the solid titanium catalyst component meeting the requirements (I) and (II), and (B) the organometallic compound catalyst component.

Olefins having 2 to 8 carbon atoms are preferred. Specific examples include ethylene, propylene, 1-butene, 4-methyl-1-pentene and 1-octene. Examples of the diolefins include non-conjugated diolefins such as dicyclopentadiene, 1,4-hexadiene and ethylidenenorbornene.

The olefins may be homopolymerized, random copolymerized and blocked copolymerized. In copolymerizations, diolefins such as conjugated or non-conjugated dienes can be chosen as a comonomer. For example, in the copolymerization of propylene, it is possible to polymerize propylene until a homopolymer is obtained in an amount of about 60 to about 90% of the total composition, and subsequently polymerizing ethylene or a mixture of propylene and ethylene. Or a mixture of propylene and ethylene may be polymerized in order to obtain a copolymer having not more than about 5% by weight of ethylene.

The polymerization can be performed either in the liquid phase or in the gaseous phase. In the liquid-phase polymerization, an inert hydrocarbon solvent such as hexane, heptane or kerosene may be used as a reaction medium, but the olefin itself may also be used as the reaction medium. In the liquid-phase polymerization, about 0.0001 to about 1.0 millimole calculated as titanium atom in component (A) of component (A) per liter of liquid phase, and about 1 to about 2000 moles, preferably about 5 to about 500 moles, of the component (B) as metal atom, per mole of the titanium atom in the component (A) may be used.

In polymerization, a molecular weight controlling agent such as hydrogen may be used. To control the stereospecificity of an alpha-olefin having at least 3 carbon atoms, the polymerization may be carried out in the copresence of an electron donor such as ethers, ethylene glycol derivatives, amines, amides, sulfur-containing compounds, nitriles, esters, carboxylic acids, acid amides, oxy acid, keto acids, acid anhydrides, acid halides and amino acids. Organic esters, above all aromatic carboxylic acid esters, are preferred as the electron donor. Such an aromatic carboxylic acid ester is selected from those used in the preparation of the solid catalyst component (A). Benzoic acid esters and nuclearly substituted benzoic acid esters are especially preferred. Specific examples of the nuclearly substituted benzoic acid esters are toluates, t-butylbenzoates, anisates, phthalates, diterephthalates, hydroxybenzoates and aminobenzoates. Alkyl esters, for example $C_1$-$C_8$ alkyl esters, are preferred. Methyl p-toluate and ethyl p-toluate are most preferred.

The electron donor may be used in the form of an adduct with the aforesaid organometallic compound, or with other compounds such as Lewis acids (e.g., $AlCl_3$). The effective amount of the electron donor is usually about 0.001 to about 10 moles, preferably about 0.01 to about 2 moles, more preferably about 0.1 to about 1 mole, per mole of the organometallic compound.

In the gaseous phase polymerization, a fluidized bed, an agitated fluidized bed, etc. are used, and the catalyst component (A) as a solid or in a form diluted with hexane, olefin, etc. and the component (B) as such or in a form diluted with hexane, olefin, etc. are fed into a polymerization vessel, and if desired, hydrogen in gaseous form is fed into the polymerization vessel to perform polymerization therein. In the gaseous-phase polymerization, about 0.001 to about 1.0 millimole calculated as titanium atom in component (A) of component (A) per liter of vapor phase, and about 1 to about 2000 moles, preferably about 5 to about 500 moles, of the component (B) as metal atom, per mole of the titanium atom in the component (A) may be used.

The polymerization of olefins is carried out preferably at a temperature of about 20° to about 200° C., more preferably about 50° to about 180° C. and a pressure of from atmospheric pressure to about 100 kg/cm$^2$, preferably about 2 to about 50 kg/cm$^2$. The polymerization may be performed batchwise, semicontinuously, or continuously. It is also possible to perform the polymerization in two or more stages having different reaction conditions.

In particular, when applied to stereospecific polymerization of alpha-olefins having at least 3 carbon atoms, the process of this invention can afford polymers having a high stereospecificity index with a high catalytic efficiency. In polymerizing olefins using a similar solid catalyst component previously suggested, an attempt to obtain a polymer of a high melt index by using hydrogen frequently results in a tendency of unnegligibly decreasing the stereospecificity of the polymer, but the process of this invention can reduce this tendency. As the catalyst component in accordance with this invention is highly active, the amount of the polymer yielded per unit weight of the solid titanium catalyst component is larger than that in the prior art when obtaining a polymer of the same stereospecific index. Accordingly, the amount of the catalyst residue in the polymer, especially its halogen content, can be reduced, and the operation of removing the catalyst can be omitted. Moreover, the tendency of corrosion of molds in molding the resulting polymer can be markedly inhibited.

Furthermore, by slurry polymerization or gaseous phase polymerization, too, a polymer in the form of granules or nearly spherical particles like an aggregate of fine particles can be formed. Such a granular or spherical polymer has good flowability, and in some applications, it can be used without pelletization.

The particle diameter of the polymer can be easily controlled by changing the catalyst preparing conditions in accordance with this invention.

The following Examples illustrate the present invention more specifically.

EXAMPLE 1

Preparation of a catalyst component (A):

Anhydrous magnesium chloride (4.76 g), 15 ml of decane and 18.1 ml of 2-ethylhexyl alcohol were reacted at 120° C. for 2 hours to form a uniform solution, and then 0.84 ml of ethyl benzoate was added. The mixture was maintained at 120° C. for 1 hour with stirring, and then cooled to room temperature. The solution was added to 200 ml of titanium tetrachloride maintained at 0° C., and the mixture was maintained at this temperature for 1 hour. Then, the temperature was gradually raised to 20° C. over 1 hour, and then raised to 80° C. over 30 minutes. When the temperature was raised to 80° C., ethyl benzoate (2.33 ml) was added and the solution was maintained at this temperature for 2 hours with stirring. The solid portion in this suspension was collected by filtration, and again suspended in 100 ml of titanium tetrachloride. Ethyl benzoate (2.23 ml) was added, and with stirring, the mixture was maintained at 90° C. for 2 hours. The solid material was collected by filtration, and washed well with purified hexane until no free titanium compound was detected in the wash liquid. The solid was then dried to afford a catalyst component (A) containing 3.3% by weight of titanium, 57.0% by weight of chlorine, 16.0% by weight of magnesium and 14.4% by weight of ethyl benzoate.

Polymerization:

A 2-liter autoclave was charged with 750 ml of purified hexane, and then with 1.67 mmoles of triisobutyl aluminum, 0.833 mmole of ethyl aluminum sesquichloride and 0.5 mmole of methyl p-toluate under an atmosphere of propylene at room temperature. Five minutes later, 0.015 mmole of the catalyst component (A) calculated as titanium atom was fed into the autoclave. Hydrogen (400 ml) was introduced into it, and the temperature was raised to 70° C. Propylene was polymerized at this temperature for 2 hours. During the polymerization, the pressure was maintained at 7 kg/cm².

After the polymerization, the slurry containing the resulting polymer was filtered to separate it into a white powdery polymer and a liquid layer. On drying, the amount of the white powdery polymer obtained was 315.0 g. The polymer had a boiling n-heptane extraction residue of 98.4%, a melt index (M.I.) of 6.4 and an apparent density of 0.44 g/ml. Concentrating the liquid layer afforded 2.6 g of a solvent-soluble polymer. Accordingly, the catalyst activity was 21000 g-PP/mmole-Ti, and I.I. was 97.6%.

The particle size distribution of the polymer was very good, and the proportion of particles having a size of 250 to 105 microns was 91.3% of the entire polymer.

EXAMPLE 2

Preparation of a catalyst component (A):

Anhydrous magnesium chloride (4.76 g), 15 ml of decane and 23.2 ml of 2-ethylhexyl alcohol were reacted at 120° C. for 2 hours to form a uniform solution, and then 1.43 ml of ethyl benzoate was added. The mixture was maintained at 120° C. for 1 hour with stirring, and then cooled to room temperature. The solution was added to 200 ml of titanium tetrachloride maintained at −20° C., and the mixture was maintained at this temperature for 1 hour. Then, the temperature was gradually raised to 20° C. over 1 hour, and then raised to 80° C. over 30 minutes. When the temperature was raised to 80° C., ethyl benzoate (2.50 ml) was added and the solution was maintained at this temperature for 2 hours. The solid portion in this suspension was collected by filtration, and again suspended in 100 ml of titanium tetrachloride. Ethyl benzoate (3.26 ml) was added, and with stirring, the mixture was maintained at 90° C. for 2 hours. Then, by the same procedure as in Example 1, a catalyst component (A) was prepared. The catalyst component (A) contained 3.4% by weight of titanium, 57.0% by weight of chlorine, 18.0% by weight of magnesium and 15.2% by weight of ethyl benzoate.

Propylene was polymerized in the same way as in Example 1. The results are shown in Table 1.

The particle size distribution of the polymer was very good, and the proportion of particles having a size of 420 to 250 microns was 95.8% of the entire polymer.

EXAMPLE 3

Example 1 was repeated except that the amount of hydrogen used in the polymerization was changed to 1 liter. The results are shown in Table 1.

EXAMPLE 4

Example 1 was repeated except that the amount of hydrogen used in the polymerization was changed to 2 liters. The results are shown in Table 1.

EXAMPLE 5

Example 1 was repeated except that the amount of triisobutyl aluminum, ethyl aluminum sesquichloride and methyl p-toluate used in the polymerization were changed to 0.50 mmole, to 0.25 mmole, and to 0.15 mmole, respectively. The results are shown in Table 1.

EXAMPLE 6

A 2-liter autoclave was charged with 750 ml of purified hexane, and then with 0.88 mmole of triethyl aluminum, 0.32 mmole of ethyl aluminum sesquichloride and 0.30 mmole of methyl p-toluate under an atmosphere of propylene at room temperature. Five minutes later, 0.015 mmole of the catalyst component (A) synthesized in Example 2, calculated as titanium atom, was fed into the autoclave. The autoclave was closed, and then heated. At 60° C., hydrogen (500 ml) was introduced into it, and then a mixed gas of propylene and ethylene (propylene: 93.6 mol%, ethylene 6.4 mol%) was introduced. The polymerization system was kept at 60° C., and the total pressure was maintained at 4.0 kg/cm². Two hours after introducing the mixed gas, the polymerization system was cooled to terminate the reaction.

After polymerization, the slurry containing the resulting polymer was filtered to separate it into a white powdery polymer obtained and a liquid layer. The amount of the powdery polymer was 332.6 g. The polymer had a melt index (M.I.) of 8.2, an apparent density of 0.38 g/ml and a melting point of 135° C. and contained 4.3 mole% of ethylene. Concentrating the liquid layer afforded 21.3 g of a solvent-soluble polymer.

EXAMPLE 7

A 2-liter autoclave was charged with 1 liter of purified hexane, and then heated. At 60° C., 1.0 mmole of triethyl aluminum and 0.02 mmole, calculated as titanium atom, of the catalyst component (A) synthesized in Example 1 were added, and then the autoclave was closed. Hydrogen was introduced to a pressure of 0.6 kg/cm², and then a mixed gas of ethylene and butene (ethylene: 93,2 mol%, butene 6.8 mol%) was introduced. The polymerization system was kept at 70° C., and the total pressure was maintained at 3.0 kg/cm². Two hours after the introduction of the mixed gas, the polymerization system was cooled to terminate the reaction.

After the polymerization, the slurry containing the resulting polymer was filtered to collect a white powdery polymer. After drying, the amount of the white powdery polymer yielded was 251.4 g. The polymer had a density of 0.930, an apparent density of 0.38 g/ml, and an MI of 1.7.

The particle size distribution of the polymer was very good, and the proportion of particles having a size of 105 to 177 microns was 87.3% of the entire polymer. Concentrating the liquid layer afforded 6.5 g of a solvent-soluble polymer. Accordingly, the catalyst activity was 16800 g-PE/mmole-Ti, and yield was 97.5%.

EXAMPLE 8

Anhydrous magnesium chloride (4.76 g), 15 ml of decane and 19.3 ml of 2-ethylhexyl alcohol were reacted at 120° C. for 2 hours to form a uniform solution. Then, 1.8 ml of benzoyl chloride was added, and the mixture was maintained at 120° C. for 1 hour with stirring. The solution was then cooled to room temperature. The cooled solution was added to 200 ml of titanium tetrachloride maintained at 0° C. Then, by the same procedure as in Example 1, a catalyst component (A) was prepared. The catalyst component (A) contained 5.8% by weight of titanium, 55.0% by weight of chlorine, 16.0% by weight of magnesium and 14.5% by weight of 2-ethylhexyl benzoate.

Polymerization:

A 3-liter autoclave was charged with 1500 ml of purified hexane, and then with 1.0 mmole of triethyl aluminum, 0.5 mmole of ethyl aluminum sesquichloride and 0.03 mmole, calculated as titanium atom, of the catalyst component (A) under an atmosphere of nitrogen at room temperature. The autoclave was closed, and then heated. At 60° C., hydrogen was introduced to a pressure of 4.0 kg/cm$^2$, and then ethylene was introduced. The polymerization system was kept at 70° C., and the total pressure was maintained at 8.0 kg/cm$^2$. Two hours after the introduction of ethylene, the polymerization system was cooled to terminate the reaction.

After the polymerization, the slurry containing the resulting polymer was filtered to collect a white powdery polymer. After drying, the amount of the white powdery polymer yielded was 429.3 g. The polymer had an apparent density of 0.35 g/ml and an MI of 1.7. The particle size distribution of the polymer was very good, and the proportion of particles having a size of 250 to 105 microns was 93.4% of the entire polymer. Accordingly, the polymerization activity was 14,300 g/mmole-Ti.

EXAMPLE 9

Glass beads (200 g) were added as a dispersing aid to a 3-liter autoclave. The inside of the autoclave was fully purged with propylene. Separately, a 100 ml flask was charged with 50 ml of hexane, 3.33 mmoles of triethyl aluminum, 1.67 mmoles of ethyl aluminum sesquichloride, 1 mmole of methyl p-toluate and 0.02 mmole, calculated as titanium atom, of the catalyst component prepared in Example 1, and they were fully stirred. The entire mixture was introduced into the autoclave. The polymerization system was closed, and hydrogen was introduced to a pressure of 2 kg/cm$^2$. Propylene was further introduced, and maintained at 70° C. and 20 kg/cm$^2$ for 2 hours with stirring.

After the polymerization, the resulting polymer was separated from the glass beads. The results are shown in Table 1.

EXAMPLE 10

Preparation of a catalyst component (A):

Anhydrous magnesium chloride (4.76 g), 70 ml of toluene and 17.7 ml of butyl alcohol were reacted at 120° C. for 2 hours to form a uniform solution, and then 1.43 ml of ethyl benzoate was added. The mixture was maintained at 120° C. for 1 hour with stirring, and then cooled. The solution was added to 200 ml of titanium tetrachloride maintained at $-20$° C., and the mixture was maintained at this temperature for 1 hour. Then, the temperature was gradually raised to 20° C. over 1 hour, and then raised to 80° C. over 30 minutes. When the temperature was raised to 80° C., ethyl benzoate (2.33 ml) was added and the solution was maintained at this temperature for 2 hours with stirring. The solid portion in this suspension was collected by filtration, and again suspended in 100 ml of titanium tetrachloride. Ethyl benzoate (2.23 ml) was added, and with stirring, the mixture was maintained at 90° C. for 2 hours. The solid material was collected by filtration, and washed well with purified hexane until no free titanium compound was detected in the wash liquid. The solid was then dried to afford a catalyst component (A).

Polymerization:

Ethylene was polymerized in the same way as in Example 8 except that the catalyst component obtained as above was used. The results are shown in Table 1.

EXAMPLE 11

A catalyst component was prepared in the same way as in Example 10 except that 14.4 ml of n-propyl alcohol was used instead of 17.7 ml of butyl alcohol. Using the resulting catalyst component, ethylene was polymerized in the same way as in Example 10. The results are shown in Table 1.

EXAMPLE 12

Anhydrous magnesium chloride (4.76 g), 23.2 ml of 2-ethylhexyl alcohol and 25 ml of decane were reacted at 120° C. for 2 hours to form a uniform solution. Then, 2.3 ml of ethyl benzoate was added. The uniform solution was added dropwise with stirring over 1 hour to 200 ml of titanium tetrachloride cooled at $-20$° C.

The mixture was maintained at 90° C. for 2 hours with stirring. The solid portion was collected by filtration, and again suspended in 100 ml of titanium tetrachloride, followed by reaction at 90° C. for 2 hours. The solid material was collected by filtration, and washed well with purified hexane until no free titanium compound was detected in the wash liquid. The solid was then dried to afford a catalyst component (A) containing 3.8% by weight of titanium, 56% by weight of chlorine, 17% by weight of magnesium and 14.1% by weight of ethyl benzoate.

Propylene was polymerized in the same way as in Example 1 except that the amount of hydrogen was changed to 500 ml. The results of the polymerization are shown in Table 1.

EXAMPLE 13

Anhydrous magnesium chloride (4.76 g), 19.4 ml of 2-ethylhexyl alcohol, 2.3 ml of ethyl benzoate and 25 ml of decane were reacted at 120° C. for 2 hours to form a uniform solution which was then cooled. The uniform solution was added dropwise with stirring over 1 hour to 200 ml of titanium tetrachloride cooled at $-20$° C.

Then, by the same procedure as in Example 2, a titanium component (A) was prepared. The component (A) contained 4.4% by weight of titanium, 59.0% by weight of chlorine, 18.0% by weight of magnesium and 13.7% by weight of ethyl benzoate.

Polymerization:

A 2-liter autoclave was charged with 750 ml of purified hexane, and with 3.75 mmoles of triethyl aluminum, and 1.25 mmoles of methyl p-toluate under an atmosphere of propylene at room temperature. Five minutes later, 0.0225 mmole, calculated as titanium atom, of the catalyst component (A) was fed into the autoclave, and then 500 ml of hydrogen was introduced into it. The temperature was raised to 60° C., and propylene was polymerized at this temperature for 2 hours. During the polymerization, the pressure was maintained at 7 kg/cm$^2$. The results of the polymerization are shown in Table 1.

EXAMPLE 14

Magnesium chloride (4.76 g) and 30.9 ml of 2-ethylhexyl alcohol were reacted at 130° C. for 2 hours with stirring to form a uniform solution. Ethyl benzoate (2.3 ml) was added to the solution, and the mixture was maintained at this temperature for 1 hour with stirring. The resulting solution was added dropwise with stirring over 1 hour to 200 ml of titanium tetrachloride cooled to 0° C. Then, by the same procedure as in Example 12, a catalyst component (A) was obtained. Propylene was polymerized in the same way as in Example 12. The results are shown in Table 1.

EXAMPLE 15

Preparation of a catalyst component (A):

A decane solution (83.6 ml) containing 50 mmoles of ethylbutyl magnesium was reacted with 15.4 ml of 2-ethylhexanol at 80° C. for 2 hours to form a uniform solution. To the uniform solution was added 1.43 ml of ethyl benzoate to form a uniform solution. The solution was added dropwise with stirring over 1 hour to 200 ml of titanium tetrachloride maintained at −20° C. Then, by the same procedure as in Example 12, a catalyst component (A) was prepared.

Polymerization:

Propylene was polymerized in the same way as in Example 13 except that ethyl benzoate was used instead of the methyl p-toluate. The catalytic activity was 14000 g-PP/mmole-Ti, and I.I. was 93.8%.

EXAMPLE 16

Ethyl benzoate (1.43 ml) was added to a uniform solution obtained by mixing 5.25 g of ethoxy magnesium chloride, 7.7 ml of 2-ethylhexyl alcohol and 50 ml of decane at room temperature. The resulting uniform solution was added dropwise over 1 hour to 200 ml of titanium tetrachloride maintained at −20° C.

Then, by the same procedure as in Example 12, a catalyst component (A) was prepared. Propylene was polymerized in the same way as in Example 12. The results are shown in Table 1.

EXAMPLE 17

Magnesium metal (1.22 g), 4.0 ml of methanol, 23.3 ml of 2-ethylhexyl alcohol and then 1.43 ml of ethyl benzoate and 50 ml of decane were reacted at 65° C. for 4 hours in the presence of hydrogen chloride to form a uniform solution.

Then, by the same procedure as in Example 12, a catalyst component (A) was prepared. Propylene was polymerized in the same way as in Example 12. The results are shown in Table 1.

EXAMPLE 18

A solid substance formed by the reaction of 50 mmoles of butyl magnesium chloride with silicon tetrachloride, 25 ml of decane and 23.4 ml of 2-ethylhexyl alcohol were reacted at 120° C. for 2 hours to form a uniform solution. The solution was cooled, and 1.8 ml of benzoyl chloride was added. Then, by the same procedure as in Example 12, a catalyst component (A) was prepared. Propylene was polymerized in the same way as in Example 12. The results are shown in Table 1.

EXAMPLE 19

Diethoxy magnesium (5.73 g), 23.4 ml of 2-ethylhexyl alcohol and 50 ml of decane were reacted in the presence of hydrogen chloride at 130° C. for 3 hours to form a uniform solution, and then, 1.43 ml of ethyl benzoate was added.

Then, by the same procedure as in Example 12, a catalyst component (A) was prepared. Propylene was polymerized in the same way as in Example 12. The results are shown in Table 1.

TABLE 1

| Example | White powdery polymer — Amount yielded (g) | White powdery polymer — n-Heptane extraction residue (%) | White powdery polymer — M.I. | White powdery polymer — Apparent density (g/ml) | Amount of the solvent-soluble polymer (g) | Activity (g-PP/mmole-Ti) | II (%) | Cl content in the polymer (ppm) |
|---|---|---|---|---|---|---|---|---|
| 2 | 332.4 | 98.4 | 3.0 | 0.43 | 3.1 | 22400 | 97.5 | 50 |
| 3 | 298.3 | 97.5 | 22 | 0.44 | 2.9 | 20100 | 96.6 | 55 |
| 4 | 250.3 | 96.1 | 190 | 0.43 | 3.2 | 16900 | 94.9 | 70 |
| 5 | 283.6 | 98.6 | 3.2 | 0.42 | 2.6 | 19100 | 97.7 | 40 |
| 9 | 348.3 | 96.5 | 10.3 | 0.49 | — | 17400 | 96.5 | 75 |
| 10 | 463.3 | — | 1.3 | 0.32 | — | 15400 | — | 70 |
| 11 | 470.2 | — | 2.4 | 0.34 | — | 14700 | — | 75 |
| 12 | 321.1 | 97.9 | 3.6 | 0.34 | 3.3 | 21600 | 96.9 | 50 |
| 13 | 346.5 | 96.7 | 4.5 | 0.39 | 4.9 | 15600 | 95.3 | 55 |
| 14 | 293.1 | 96.0 | 7.1 | 0.36 | 4.0 | 19800 | 94.7 | 60 |
| 16 | 258.5 | 97.4 | 4.4 | 0.35 | 3.7 | 17500 | 96.0 | 65 |
| 17 | 290.1 | 97.4 | 3.2 | 0.38 | 3.8 | 19600 | 96.1 | 65 |
| 18 | 976.5 | 97.9 | 6.3 | 0.34 | 3.4 | 18700 | 96.7 | 65 |
| 19 | 253.6 | 97.6 | 4.0 | 0.37 | 3.3 | 17100 | 96.3 | 70 |

What we claim is:

1. A solid titanium catalyst component containing magnesium, titanium, halogen and an electron donor and derived from a magnesium compound in the liquid state, a halogen-containing titanium compound in the liquid state and the electron donor for producing a polymer or copolymer of an olefin or olefins with or without up to about 5 moles of a diolefin; characterized in that said solid titanium catalyst component is
   (i) the product of reaction of (a) a magnesium compound in the liquid state having no reducing ability with (b) a halogen-containing titanium compound, in the liquid state in the presence of an electron donor having no active hydrogen, said magnesium compound (a) being a liquid magnesium compound or a solution of a magnesium compund in a hydrocarbon solvent or being obtained by contacting the magnesium compound with at least one electron donor selected from the group consisting of alcohols, organic carboxylic acids, aldehydes, amines and mixtures thereof, or
   (ii) the product of reaction of the magnesium compound (a) with the halogen-containing titanium compound (b) in the absence of the electron donor having no active hydrogen atom followed by treatment with the electron donor having no active hydrogen atom, the halogen-containing titanium compound (b) being in such an amount that the solid titanium catalyst component is formed and precipitated and is at least 1 mole per mole of the magnesium compound (a), and the mole ratio of the compound (a) to the compound (b) in the catalyst component, calculated as metal atoms, is at least about 4.

2. The catalyst component of claim 1 wherein said solid titanium catalyst component is further treated with a titanium compound in the liquid state.

3. The catalyst component of claim 1 wherein the mole ratio of the compound (a) to the compound (b), calculated as metal atoms, is from about 4 to about 50.

4. The catalyst composition of claim 1 wherein the solid titanium catalyst component is (i) the product of reaction of (a) said magnesium compound having no reducing ability in the liquid state, which is a liquid magnesium compound, with (b) said halogen-containing titanium compound, in the liquid state in the presence of said electron donor having no active hydrogen.

5. The catalyst composition of claim 1 wherein the titanium catalyst component is (i) the product of reaction of said magnesium compound having no reducing ability in the liquid state, said component (a) being a solution of said magnesium compound in a hydrocarbon solvent selected from the group consisting of aliphatic hydrocarbons, alicyclic hydrocarbons, aromatic hydrocarbons and halogenated hydrocarbons, with (b) said halogen-containing titanium compound, in the liquid state in the presence of said electron donor having no active hydrogen.

6. The catalyst composition of claim 1 wherein the titanium catalyst component is (i) the product of reaction of (a) said magnesium compound having no reducing ability in the liquid state with (b) said halogen-containing titanium compound, in the liquid state in the presence of said electron donor having no active hydrogen, said magnesium compound (a) being obtained by contacting the magnesium compound with at least one electron donor selected from the group consisting of alcohols, organic carboxylic acids, aldehydes, amines and mixtures thereof.

7. The catalyst composition of claim 1 wherein the solid titanium catalyst component is (ii) the product of reaction of said magnesium compound (a) with the halogen-containing titanium compound (b) in the absence of the electron donor having no active hydrogen atom followed by treatment with the electron donor having no active hydrogen atom.

8. The catalyst composition of claim 1 wherein the electron donor having no active hydrogen is an organic acid ester having 2 to 18 carbon atoms.

9. The catalyst composition of claim 4 wherein the electron donor having no active hydrogen is an organic acid ester having 2 to 18 carbon atoms.

10. the catalyst composition of claim 5 wherein the electron donor having no active hydrogen is an organic acid ester having 2 to 18 carbon atoms.

11. The catalyst composition of claim 6 wherein the electron donor having no active hydrogen is an organic acid ester having 2 to 18 carbon atoms.

12. The catalyst composition of claim 7 wherein the electron donor having no active hydrogen is an organic acid ester having 2 to 18 carbon atoms.

* * * * *